United States Patent [19]
White et al.

[11] Patent Number: 5,713,653
[45] Date of Patent: Feb. 3, 1998

[54] MOTORCYCLE TAIL LIGHT

[75] Inventors: Russell L. White, Raymore, Mo.; John E. Stelling, Port Washington; Brian M. Scherbarth, Menomonee Falls, both of Wis.

[73] Assignee: Harley-Davidson Motor Company, Milwaukee, Wis.

[21] Appl. No.: 686,237

[22] Filed: Jul. 23, 1996

[51] Int. Cl.⁶ .................................................. B62J 6/00
[52] U.S. Cl. .............................. 362/72; 362/83; 362/83.2; 362/367
[58] Field of Search ............................. 362/83, 72, 83.2, 362/367

[56] References Cited

U.S. PATENT DOCUMENTS 1,795,940  3/1931  Falge ................................. 362/83.2

FOREIGN PATENT DOCUMENTS 66706  3/1957  France ................................. 362/83

OTHER PUBLICATIONS

Illustration of Prior Art, Harley-Davidson Tail Light, no date.

*Primary Examiner*—Carroll B. Dority
*Attorney, Agent, or Firm*—Michael, Best & Friedrich

[57] ABSTRACT

A motorcycle tail light assembly including a base having a light bulb mount and a wiring harness connected with the mount, and a mounting means for mounting the base to the motorcycle. The assembly further includes a cover, including a tail light lens, adapted to be positioned over the base, and an attaching means for attaching the cover to a motorcycle. The mounting means is designed to maintain connection between the base and the motorcycle when the cover has been removed from the motorcycle. The tail light assembly can also include a lens engaging portion, and the cover can include a housing and a license plate lens having a first portion and a second portion. The lens engaging portion of the base engages the second portion to force the first portion into engagement with the housing.

9 Claims, 4 Drawing Sheets

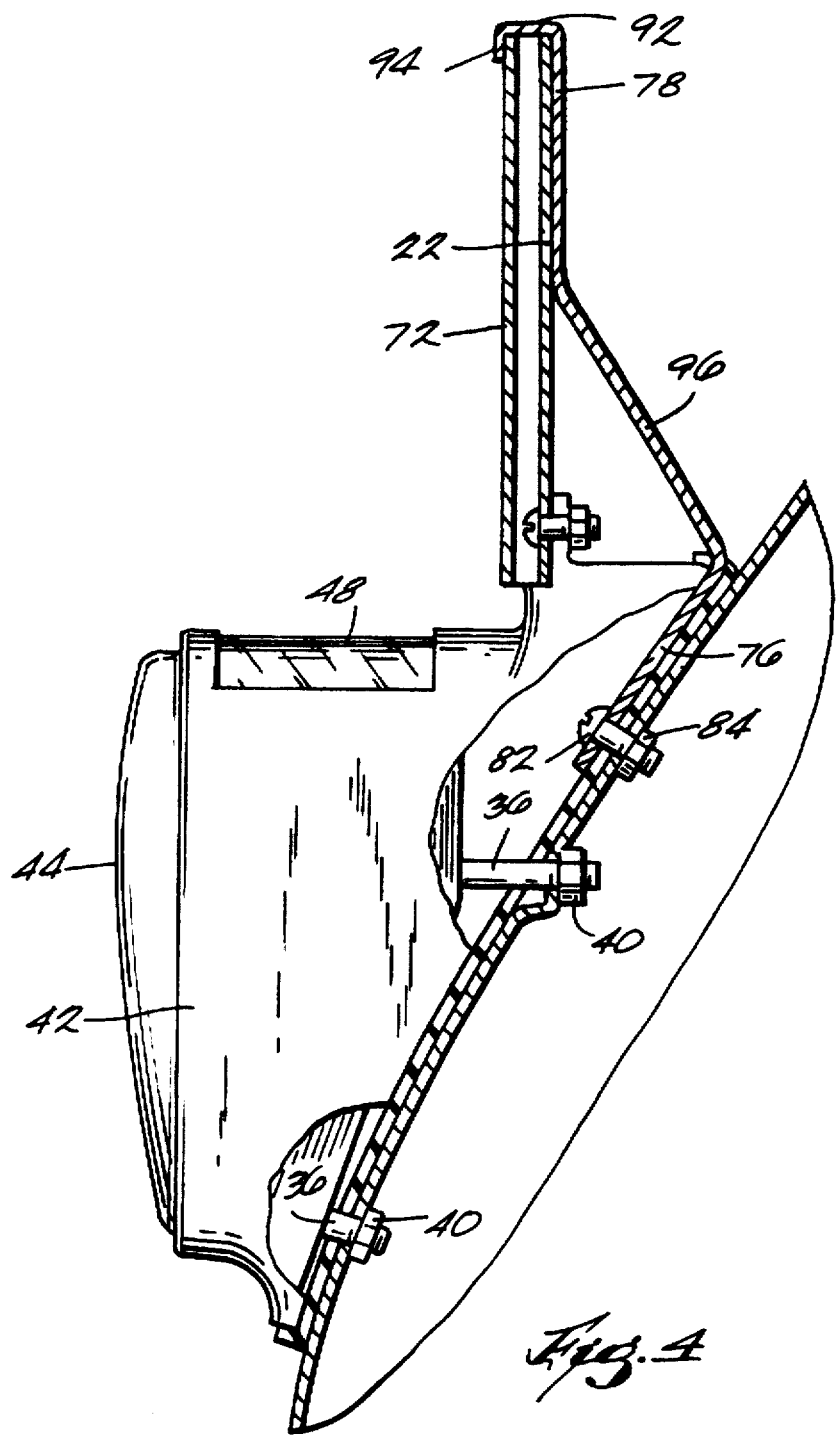

MOTORCYCLE TAIL LIGHT

FIELD OF THE INVENTION

The present invention generally relates to the field of motorcycles, and more specifically to the field of motorcycle tail lights.

BACKGROUND OF THE INVENTION

Motorcycles designed for road use include tail lights on the back of the motorcycle for obvious safety reasons and to meet government regulations. Tail lights are commonly mounted on the rear fender of motorcycles, and can include both the running light and the brake light.

Tail lights typically include a base and cover. The base includes a bulb mount for receiving a light bulb and a wiring harness for providing power to the light bulb. The cover includes a lens, usually colored transparent red, that is positioned over the base. The cover and base are secured to the rear of the motorcycle using fasteners (e.g., bolts or screws) extending through the cover and base and threaded into the motorcycle. For example, the fasteners can be threaded into the rear fender of the motorcycle.

Most motorcycles also include a license plate mount for supporting a license plate on the rear of the motorcycle. Such license plate mounts are commonly secured to the tail light and usually include two apertures to facilitate securing the license plate to the license plate mount using fasteners such as bolts or screws.

SUMMARY OF THE INVENTION

One problem with the above-described tail light is that changing of the light bulb can be a difficult process and can result in damage to the motorcycle. More specifically, to change the light bulb, the fasteners holding the cover and the base to the motorcycle must be removed. Once the fasteners are removed, the cover can be removed and the base will fall and dangle by the wiring harness. This can cause damage to the wiring harness and can scratch or otherwise damage thecosmetics of the motorcycle.

To alleviate this problem, the present invention provides a motorcycle tail light assembly that facilitates changing the light bulb without having the base dangle from the wiring harness. The tail light assembly includes a base having a light bulb mount and a wiring harness connected with the mount, and a mounting means for mounting the base to the motorcycle. The assembly further includes a cover, including a tail light lens, adapted to be positioned over the base, and an attaching means for attaching the cover to a motorcycle. The mounting means is designed to maintain connection between the base and the motorcycle when the cover has been removed from the motorcycle. In one embodiment, the mounting means includes at least one threaded stud extending from the base, preferably rigidly secured to the base. The attaching means can include a fastener (e.g., a threaded fastener) extending through the cover and secured to the base (e.g., in a threaded orifice).

In another aspect, the tail light assembly includes a base having a light bulb mount, a wiring harness connected with the mount, and a lens engaging portion. A cover is adapted to be positioned over the base. The cover includes a housing and a license plate lens having a first portion and a second portion. The lens engaging portion of the base engages the second portion to force the first portion into engagement with the housing.

In one embodiment, at least one of the lens engaging portion and the second portion includes a ramped surface positioned such that movement of the license plate lens toward the base causes movement of the first portion toward the housing. Preferably, the lens engaging portion includes a ramped surface, and the second portion of the license plate lens includes a U-shaped channel dimensioned to slidably engage the ramped surface. The cover can also include a lens gasket positioned between the license plate lens and the cover, such that the base engages the second portion to sandwich the gasket between the first portion and the housing. The license plate lens is preferably adhesively connected to the cover.

In another aspect, the present invention provides a method of securing a tail light assembly to a motorcycle, the tail light assembly including a housing and a lens. The method includes the steps of moving the housing and the lens in a first direction toward the motorcycle, forcing the lens in a second direction, angled from the first direction, toward the housing, and creating a sealed engagement between the lens and the housing. In one embodiment, the tail light assembly further includes a base, and the method further includes the step of connecting the base to the motorcycle, and the moving step includes moving the housing and the lens toward the base. Preferably, the base includes a ramped surface, and the forcing step includes the steps of engaging the lens with the ramped surface, and sliding the lens relative to the ramped surface. The tail light assembly can further include a gasket, and the method can further include the step of positioning the gasket between the lens and the housing.

BRIEF DESCRIPTION OF THE DRAWINGS

FIG. 4 is a partial side section view of the tail light assembly of FIG. 2.

DETAILED DESCRIPTION

Figure 1:
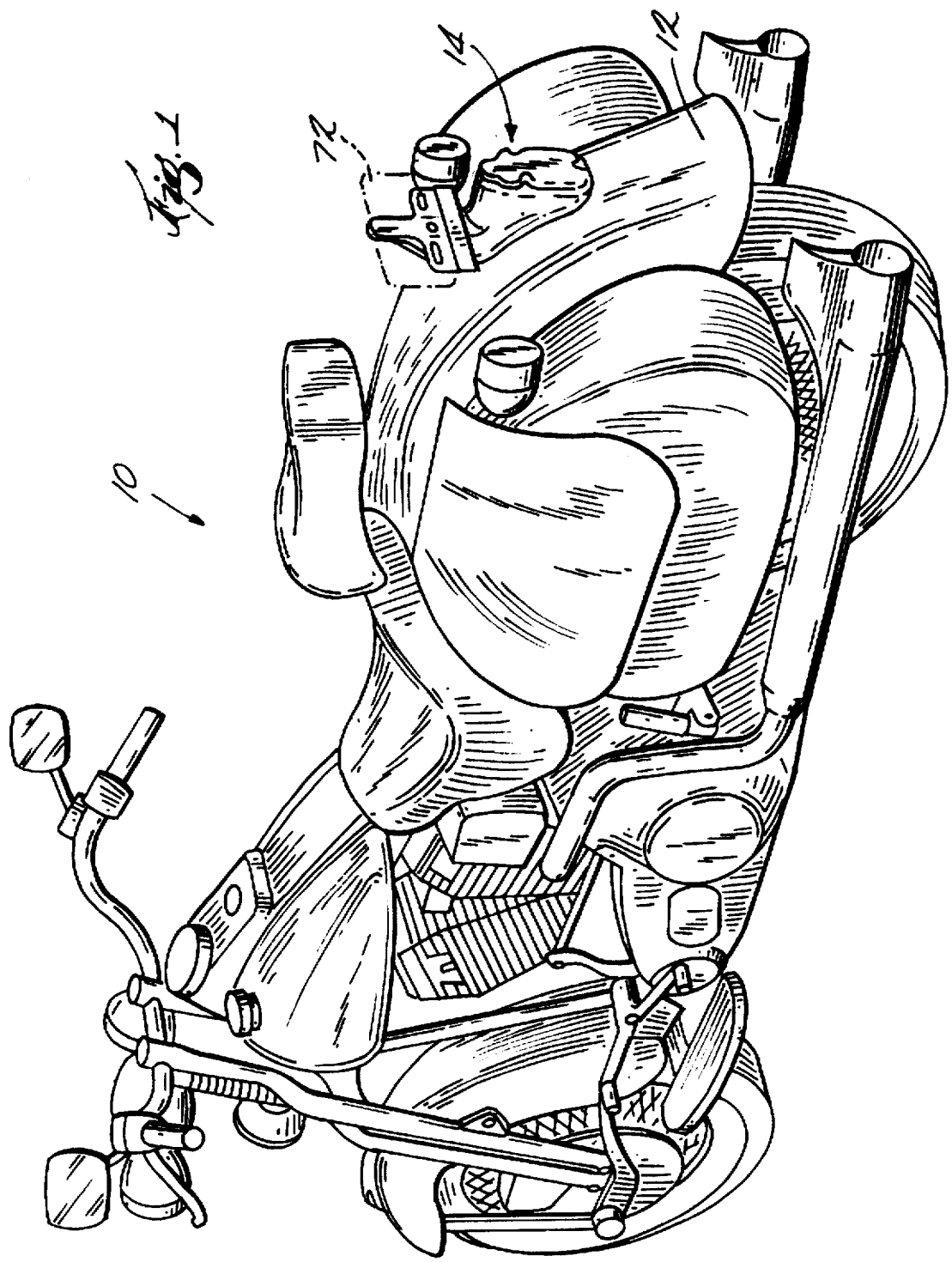
FIG. 1 is a perspective view of a motorcycle having a tail light assembly embodying the present invention.
Figure 2:
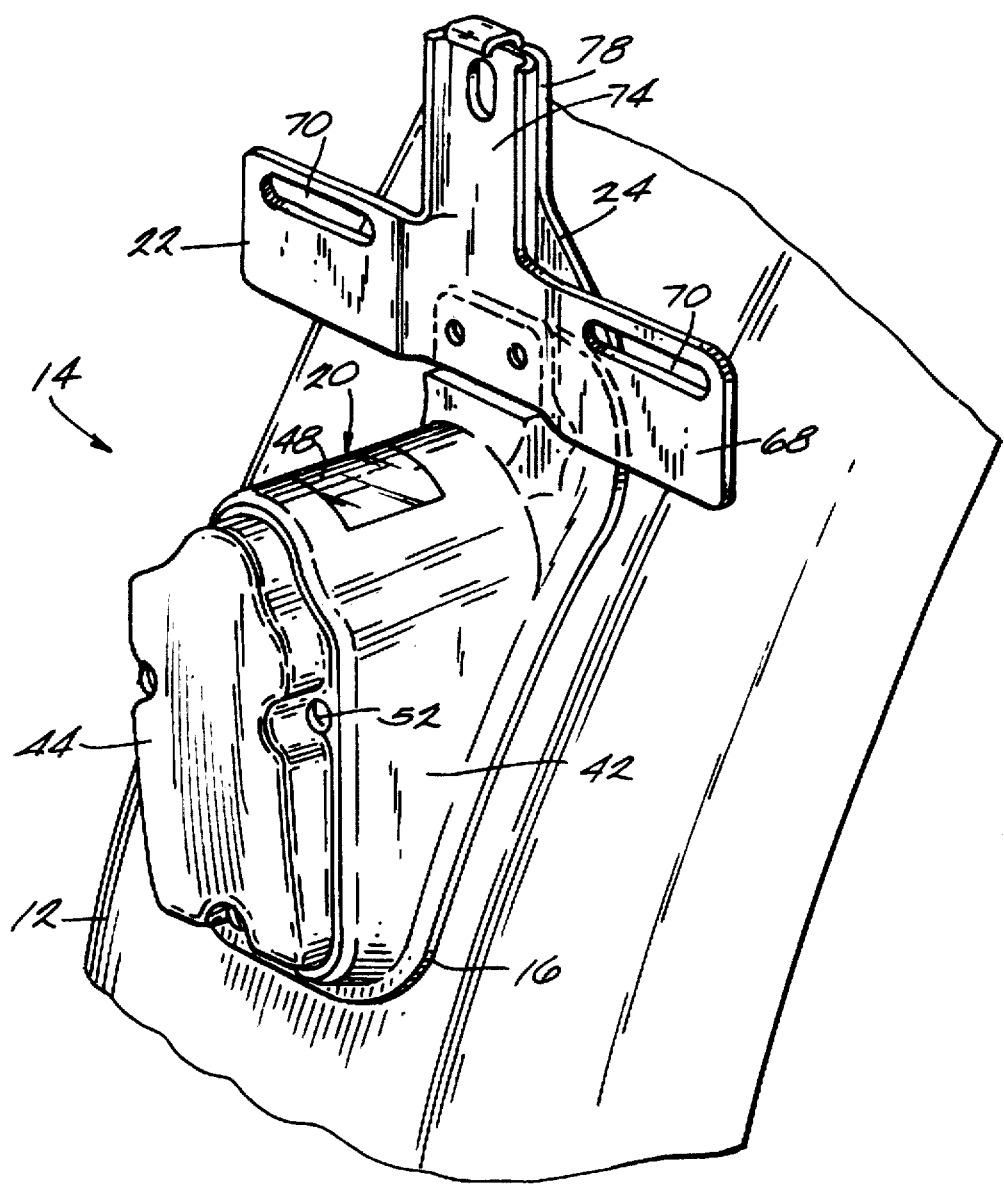
FIG. 2 is an enlarged perspective view of the tail light assembly of FIG. 1.
Figure 3:
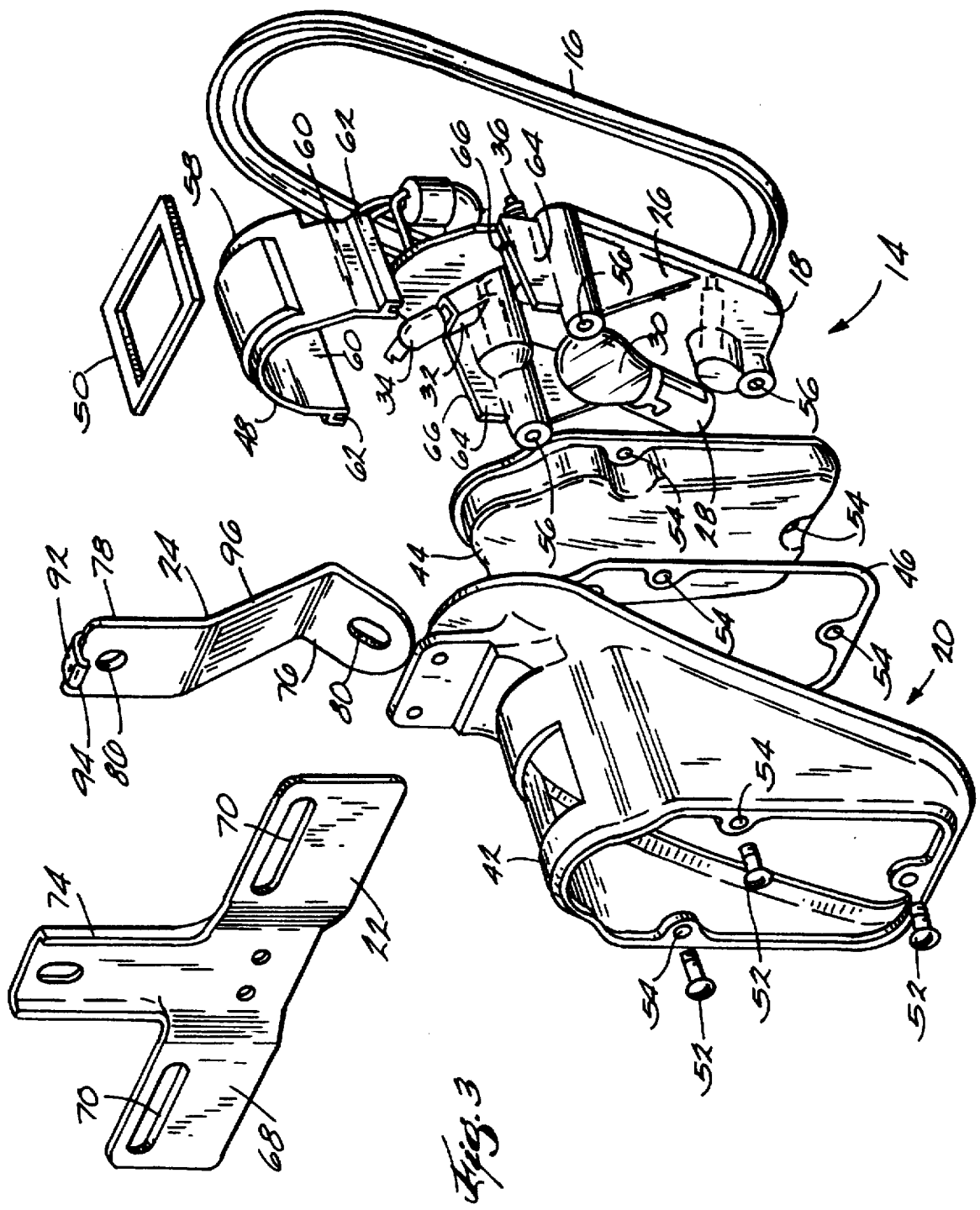
FIG. 3 is an assembly view of the tail light assembly of FIG. 2.

FIG. 1 illustrates a motorcycle 10 having a rear fender 12 and a tail light assembly 14 mounted on the rear fender 12. Referring to FIGS. 2–4, the tail light assembly 14 generally includes a resilient gasket 16 positioned in contact with the rear fender 12, a base 18 positioned within the gasket 16 and mounted to the rear fender 12, and a cover 20 secured to the base 18 and positioned in sealing engagement with the gasket 16. A license plate mount 22 is secured to the cover 20 and a support bracket 24 provides support to the license plate mount 22.

The base 18 includes a main body 26 molded from a rigid plastic material. A tail light bulb mount 28 is attached to the main body 26 and is designed to receive a tail light bulb 30. Similarly, a license plate bulb mount 32 is secured to the main body 26 and is designed to receive a license place bulb 34.

The tail light assembly 14 further includes a mounting means for mounting the base 18 to the motorcycle 10. In the illustrated embodiment, the mounting means includes three threaded studs 36 that are secured to and extend outwardly from the base 18. The threaded studs 36 are positioned such that they can be inserted through three corresponding holes 38 in the rear fender 12 of the motorcycle 10, such that three securing nuts 40 can be threaded onto the studs 36 to secure the base 18 to the rear fender 12 of the motorcycle 10. The threaded studs 36 can be molded into the main body 26 of the base 18 or, alternatively, bonded or press fit to the base 18 after the main body 26 has been molded.

The cover 20 includes a main housing 42, a tail light lens 44 and a tail light gasket 46 positioned between the tail light lens 44 and the main housing 42. The cover 20 further includes a license plate lens 48 and a license plate gasket 50 positioned between the license plate lens 48 and the main housing 42. The license plate lens 48 is adhesively secured to the license plate gasket 50, and the license plate gasket 50 is adhesively secured to the main housing 42.

The tail light assembly 14 further includes an attaching means for attaching the cover 20 to the motorcycle 10. In the illustrated embodiment, the attaching means includes a plurality of fasteners in the form of threaded screws 52 that secure the cover 20 to the base 18. In this regard, the main housing 42, tail light gasket 46 and tail light lens 44 each include aligned apertures 54 that allow the threaded screws 52 to be inserted therethrough. Furthermore, the main body 26 of the base 18 includes threaded orifices 56 for threadedly receiving the threaded screws 52. The threaded orifices 56 are formed by molding threaded inserts (not shown) into the main body 26 of the base 18.

The license plate lens 48 includes a first portion 58 engaged with the license plate gasket 50, and a second portion 60 extending away from the first portion 58. In the illustrated embodiment, the second portion 60 is formed by two inverted U-shaped channels 62. The base 18 includes a lens engaging portion 64 having ramped surfaces 66 dimensioned to be positioned within the U-shaped channels 62. The ramped surfaces 66 are positioned at an angle with respect to the shafts of the threaded screws 52, such that movement of the housing 42 and the license plate lens 48 toward the base 18 will result in movement of the license plate lens 48 upwardly toward the main housing 42. This feature facilitates a sealing engagement by sandwiching the license plate gasket 50 between the license plate lens 48 and the main housing 42.

In the illustrated embodiment, the license plate mount 22 includes a lower end 68 that is secured to the housing 42, but could instead be secured to the base 18. The license plate mount 22 includes two apertures 70 for facilitating mounting of a license plate 72 (FIG. 1) to the license plate mount 22. The license plate mount 22 further includes an upper end 74 for supporting the upper portion of a license plate.

The support bracket 24 includes a first end 76 secured to the motorcycle 10 and a second end 78 secured to the upper end 74 of the license plate mount 22 to thereby reinforce the upper end 74 of the mount 22. In the illustrated embodiment, the first end 76 includes a hole 80 for facilitating securement to the rear fender 12 by an appropriate fastening means, such as a nut 82 and a bolt 84. The second end 78 similarly includes a hole 86 for facilitating securement of the second end 78 to the upper end 74 of the license plate mount 22 by an appropriate fastening means. The second end 78 of the support bracket 24 further includes a support lip 92 having a hook portion 94 that extends over the upper end 74 of the license plate mount 22 to provide support to an upper edge of a license plate secured to the license plate mount 22. The support bracket 24 further includes an intermediate portion 96 positioned at an angle relative to the first and second ends 76,78 to thereby provide a triangulated support to the upper end 74 of the license plate mount 22.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described herein are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A motorcycle tail light assembly for mounting on a motorcycle, said assembly comprising:

a base including a light bulb mount, a wiring harness connected with said mount, and a lens engaging portion; and a cover adapted to be positioned over said base, said cover including:

a housing; and a license plate lens having a first portion and a second portion, wherein said lens engaging portion of said base engages said second portion to force said first portion into engagement with said housing.

2. A motorcycle tail light assembly as claimed in claim 1, wherein at least one of said lens engaging portion and said second portion includes a ramped surface positioned such that movement of said license plate lens toward said base causes movement of said first portion toward said housing.

3. A motorcycle tail light assembly as claimed in claim 1, wherein said lens engaging portion includes a ramped surface, and wherein said second portion of said license plate lens includes at least one U-shaped channel dimensioned to slidably engage said ramped surface.

4. A motorcycle tail light assembly as claimed in claim 3, wherein said base includes two ramped surfaces, and wherein said second portion of said license plate lens includes two U-shaped channels dimensioned to slidably engage said ramped surfaces.

5. A motorcycle tail light assembly as claimed in claim 1, wherein said cover further includes a lens gasket positioned between said license plate lens and said cover, wherein said base engages said second portion to sandwich said gasket between said first portion and said housing.

6. A motorcycle tail light assembly as claimed in claim 1, wherein said license plate lens is adhesively connected to said cover.

7. A method of securing a tail light assembly to a motorcycle, the tail light assembly including a housing, a base and a lens, said method comprising the steps of:

moving the housing and the lens in a first direction toward the motorcycle;

forcing the lens in a second direction, angled from the first direction, toward the housing by engagement with the base; and creating a sealed engagement between the lens and the housing.

8. A method as claimed in claim 7, wherein the base includes a ramped surface, and wherein said forcing step includes the steps of:

engaging the lens with the ramped surface; and sliding the lens relative to the ramped surface.

9. A method as claimed in claim 7, wherein the tail light assembly further includes a gasket, and wherein said method further includes the step of positioning the gasket between the lens and the housing.

* * * * *